(12) United States Patent
Van Hoorn

(10) Patent No.: US 9,561,906 B2
(45) Date of Patent: Feb. 7, 2017

(54) CIRCUMFERENTIALLY FOLDABLE MULTIPLE PRONGED HOOK

(71) Applicant: John Carl Van Hoorn, Wonder Lake, IL (US)

(72) Inventor: John Carl Van Hoorn, Wonder Lake, IL (US)

(*) Notice: Subject to any disclaimer, the term of this patent is extended or adjusted under 35 U.S.C. 154(b) by 0 days.

(21) Appl. No.: 14/683,740

(22) Filed: Apr. 10, 2015

(65) Prior Publication Data

US 2016/0297614 A1    Oct. 13, 2016

(51) Int. Cl.
  *B66C 1/34* (2006.01)
  *B65G 7/12* (2006.01)

(52) U.S. Cl.
  CPC ..................... *B65G 7/12* (2013.01)

(58) Field of Classification Search
  CPC .................... B65G 7/12; B66C 1/12
  USPC .......... 294/82.1, 82.11, 82.12, 82.13, 82.17, 294/82.21, 66.1; 114/297, 298, 305
  See application file for complete search history.

(56) References Cited

U.S. PATENT DOCUMENTS

| | | | | |
|---|---|---|---|---|
| 289,508 A * | 12/1883 | Dawson | ................ | A01K 85/14 43/42.18 |
| 1,031,903 A * | 7/1912 | Anderson | ............... | B63C 11/50 294/66.1 |
| 1,776,967 A * | 9/1930 | Eckart | .................... | A01K 95/00 114/294 |
| 2,523,833 A * | 9/1950 | Lando | .................... | A01K 83/00 43/42.52 |
| 2,602,689 A * | 7/1952 | Matz | ....................... | B63C 11/50 114/305 |
| 2,791,982 A * | 5/1957 | Parry | .................... | B63B 21/243 114/298 |
| 3,092,412 A * | 6/1963 | Drake | .................... | B63C 11/50 24/115 M |
| 3,428,014 A * | 2/1969 | Smith | ..................... | B63B 21/46 114/298 |
| 4,702,507 A * | 10/1987 | Medendorp | .............. | A62B 1/16 114/305 |
| 5,425,195 A * | 6/1995 | Nakamichi | ........... | A01K 83/00 43/44.82 |
| 8,550,518 B1 * | 10/2013 | Lucas | ................... | A01M 31/02 294/82.11 |
| 9,072,283 B2 * | 7/2015 | Lee | ......................... | A01K 83/00 |
| 2005/0193939 A1 * | 9/2005 | Ross | ....................... | B63B 21/24 114/297 |
| 2015/0133276 A1 * | 5/2015 | Kaye | .................. | A63B 21/0557 482/129 |

* cited by examiner

*Primary Examiner* — Paul T Chin
(74) *Attorney, Agent, or Firm* — Patents and Licensing LLC; Daniel W Juffernbruch

(57) ABSTRACT

A multiple pronged hook assembly has hook shafts that can be rotated and locked into desired positions individually, independent from the other hook shafts and is sealed free from outside elements, dirt, or liquid. A junction body securely encloses shafts of planetary hooks with a cylindrical opening to rotatably accommodate a cylindrical shaft of at least one circumferentially rotatable hook. A plunger rod has a rigging aperture at a top. A bottom end of the plunger is slidably disposed within a center of the junction body between the shafts of the plurality of planetary hooks to rotatably lock the at least one circumferentially rotatable hook when the plunger rod is in an up position and rotatably unlock the at least one circumferentially rotatable hook when the plunger rod is in a down position.

15 Claims, 10 Drawing Sheets

700

TOP     BOTTOM

900

CIRCUMFERENTIALLY FOLDABLE MULTIPLE PRONGED HOOK

BACKGROUND OF THE INVENTIONS

1. Technical Field

The present inventions relates to a circumferentially foldable multiple pronged hook.

2. Description of the Related Art

A multipronged hook more commonly known as a grappling hook is a very difficult item to stow safely, securely, or conveniently. Some have utilized the less common folding grappling hook to address this concern. Folding grappling hooks have traits built in leaving subjects for consideration of safety, storage, flawless operation, and transportation.

Typically folding grappling hooks leave very sharp edges exposed to personal while the hooks are in the open or closed position. A typical folding grappling hook fixed in its folded closed or open position remains a very difficult and dangerous object to deal with.

A common grappling hook or folding grappling hook is a very difficult and dangerous item to stow on one's person. A common grappling hook or folding grappling hook is a very difficult item to stow safely or securely in a vehicle. A folding grappling hook must be available to personal for quick deployment in many if not all situations. Being able to stow the grappling hook on one's self safely and efficiently is essential in situations common to recreational, rescue, tactical, and military operations.

The mechanisms of typical folding grappling hooks are exposed to the local elements. Dirt, mud, and sand are very frequently applied to the same exposed mechanisms in everyday use. It is not uncommon for these conditions to cause the malfunction or failure of these same mechanisms common to folding grappling hooks.

SUMMARY OF THE INVENTIONS

Among the many objectives of this invention is to provide a multiple pronged hook that can be collapsed into a compact state for safety, convenience, storage, and transportation.

It is a further objective of this invention to provide a multiple pronged hook that will enclose the mechanisms of operation so that the same mechanisms are not exposed to the surrounding elements.

It is still further and objective of this invention to provide for a multiple pronged hook that can be deployed by the operator quickly and efficiently in stressful conditions with minimal moving parts.

Another objective of this invention is to provide for a multiple pronged hook that is safe for personal to use whether it is in the open or closed position.

Also an objective of this invention is to provide personal with a means to secure objects otherwise out of reach of the same personal.

The objectives of this invention and other objectives will become clear and evident while in review of the claims and drawings comprised in this application.

A circumferentially foldable multiple pronged hook secures objects otherwise unattainable with one's normal reach. This circumferentially foldable multiple pronged hook folds into a flat, compact, position for transportation, storage, and safety. The interior working mechanisms and components of this multiple pronged hook are sealed inside of a junction box to eliminate contamination from outside elements.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments and these and other objects and features of the inventions will be more readily understood from the following detailed description when read in conjunction with the accompanying drawings wherein:

FIGS. 2, 2a and 2b illustrate hooks positioned in various configurations of open and closed positions available at the operators discretion according to this invention;

DETAILED DESCRIPTION OF THE PREFERRED EMBODIMENTS

The circumferentially foldable multiple pronged hook of this invention comprises of at least 3 hooks with shafts that are able to rotate circumferentially and independently from the other hooks in the assembly.

The body or junction box of the assembly will receive the hooks shafts. The junction box has tubular shaft seats around the axis of the body to receive the shafts of the hooks and allow the hooks to rotate on their shafts axis. The hooks are able to rotate on their axis so that each hook is parallel to each of the other hooks. The hooks are also able to rotate so that they are facing away from each other at predetermined angles. This invention comprises of hooks with shafts machined to allow the locking of the movable hooks into a predetermined position. The hooks can be locked in the open position. The hooks can also be locked in the closed position. The hooks can be locked open or closed independent of each other. The shafts are locked into a position on the junction box by means of a unique plunger shaft located centrally to the hook shafts and the body of the junction box assembly. This invention also provides for at least one hook in the assembly to be stationary allowing the other hooks to rest upon that stationary hook. This allows all of the hooks to lock into a position parallel to one another. The spring biased plunger shaft is depressed to allow the shafts of the hooks to rotate on the shafts axes. When the plunger is released the hooks are locked into their predetermined positions be it open or closed or any combination thereof. This circumferentially foldable multiple pronged hook comprises moving mechanisms that are sealed to outside debris and elements buy means of close tolerance of the components and may include O-rings and seals for a water tight seal of the shafts comprised in the assembly. The flats machined into the hook shafts form a lip from the remaining complete round cross section at the top of the hook shafts that will abut the flat created from the reduced round cross section of the plunger shaft.

Figure 1:
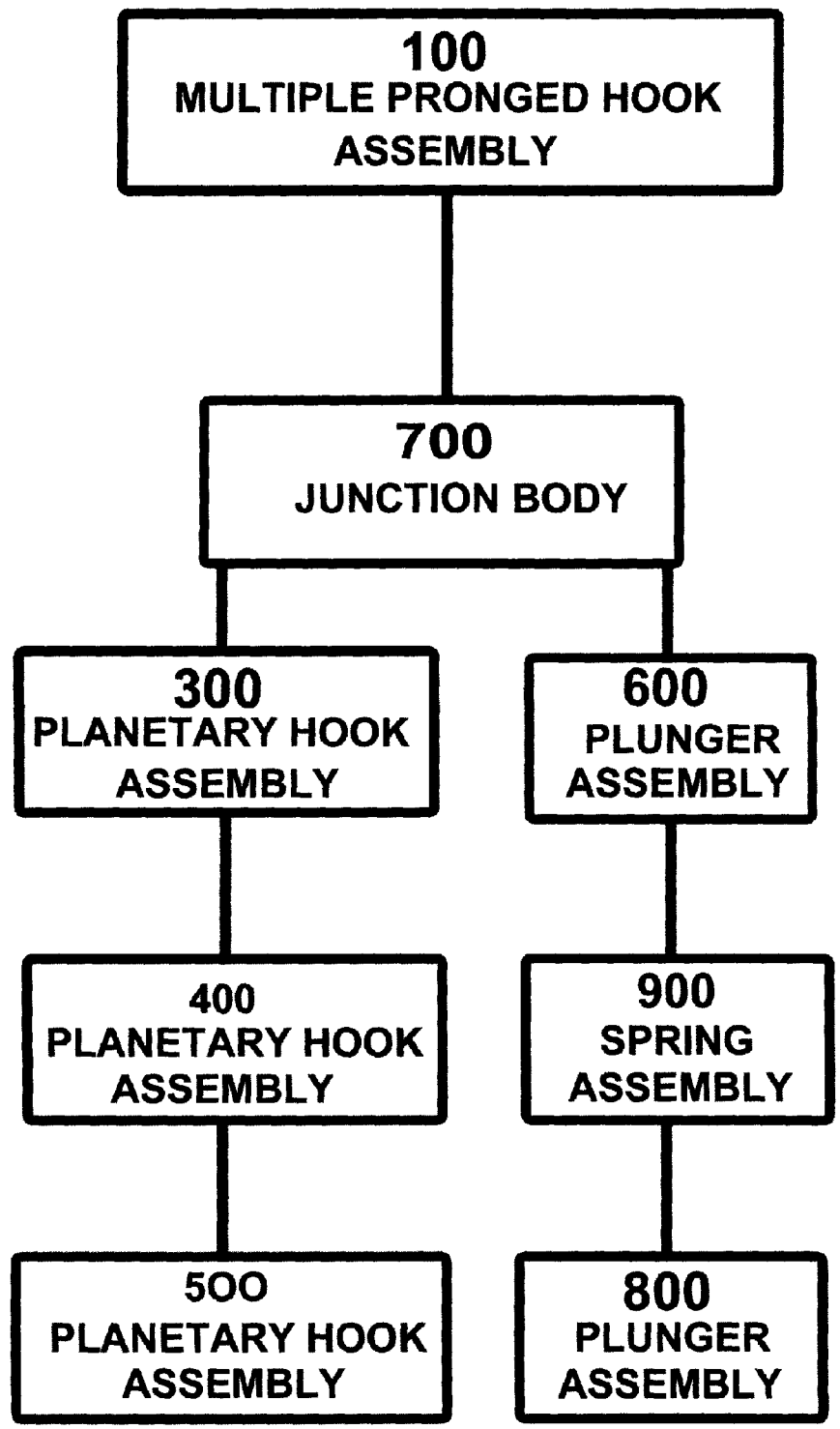
FIG. 1 depicts a block diagram of a circumferentially foldable multiple pronged hook of this invention.

FIG. 1 depicts a block diagram of a circumferentially foldable multiple pronged hook of this invention. The planetary hooks 300, 400, 500 are located inside identical receptacle hook fitting sites 702 of junction box 700. The spring 900 is located centrally to the planetary hooks 300, 400, 500 and is centrally located in the junction box 700 running parallel to item 702 hook seats. The plunger rod 600 is located inside hole 704 of junction box 700 with item 605 and 601 of plunger rod assembly 600 protruding through the top of the hole 704 in junction box 700. The plug 800 is located centrally to the planetary hooks 300, 400, 500 so that surface 805 of plug 800 is flush with the lower surface 705 of junction box 700.

Item 803 spring keeper of end plug 800 is facing item spring keeper 603 of the plunger rod 600. Planetary hooks 300, 400, and 500 are then held in place vertically by lips 801 in triplicate of plug 800 engaging with slots 304, 404, and 504 of the planetary hooks 300, 400, and 500.

The flats 604 in triplicate of plunger rod 600 are mated with flats 302, 402, and 501 of the planetary hooks 300, 400, and 500. This configuration will result in the hooks 300, 400, and 500 to be locked in the closed position. The plunger rod 600 is held in position vertically with pressure from spring 900. The plunger rod 600 is free to be depressed by personal aligning slot 601 of plunger rod 600 with top surface 706 of junction body 700. This action aligns relief sections 303 and 403 of planetary hooks 300 and 400. In this position the planetary hooks 300 and 400 are free to turn on their perspective axis independently from each other and independently of planetary hook 500. Planetary hook 500 remains locked circumferentially to junction box 700 independent of shafts of planetary hooks 300 and 400. This position allows for planetary hooks 300 and 400 to be rotated to a position that flats 301 and 401 of planetary hooks 300 and 400 are in line with flats 604 in triplicate of plunger rod 600. Pressure from personal is now relieved and spring pressure from spring 900 applies pressure to plunger rod 600. The plunger rod 600 now returns to an undepressed state and is forced by the springs pressure into a position that allows flats 604 in triplicate of plunger rod 600 to mate with surfaces 301, 401 and 501 of planetary hooks 300, 400, and 500. With components in this position the planetary hooks 300, 400, and 500 are all locked in the open position and relate 120 degrees from one another. Furthermore, planetary hooks 300 and 400 can be rotated and locked into position independent from each other by utilizing flats 301, 401, 302, 402, and 604 in triplicate of plunger rod 600. This operation requires plunger rod 600 to be depressed to a position that aligns slot 601 with the top surface 706 of junction body 700. With the plunger rod 600 in this depressed position planetary hooks 300 and 400 are free to rotate circumferentially on their perspective axis while flats 604 are now aligning with relief sections 303 and 403 of planetary hooks 300 and 400. The plunger rod 600 can be released and returned to its undepressed state to position so that flats 301, 302, 401, or 402 align and mate with flats 604 of plunger rod 600 in triplicate.

Planetary hooks 300 and 400 are considered to be in the closed and locked position when plunger rod 600 is in the undepressed position mating surface 604 of plunger rod 600 with surface 707 of junction block 700 and additionally surfaces 604 of plunger rod 600 mate with surfaces 302, 402, and 501 of planetary hooks 300, 400 and 500. While in this closed position surfaces 306, 406, and 506 of planetary hooks 300, 400 and 500 will mate with surface 606 of plunger rod 600.

Planetary hooks 300, 400, and 500 are considered in the open and locked position when plunger rod 600 is in the undepressed position mating surface 604 of plunger rod 600 with surface 707 of junction block 700 and additionally surfaces 604 in triplicate of plunger rod 600 mate with surfaces 301, 401 and 501 of planetary hooks 300, 400, and 500. While in this open position surfaces 306, 406, and 506 of planetary hooks 300, 400 and 500 will mate with surface 604 in triplicate of plunger rod 600.

In the closed position surfaces 306, 406, 506 of planetary hooks 300, 400, and 500 mate with surface 606 of plunger rod 600. This provides for a condition that any load applied to planetary hooks 300, 400, or 500 are transferred directly to plunger rod 600.

In the open position surfaces 305, 405, 506 of planetary hooks 300, 400, and 500 mate with surface 606 of plunger rod 600. This provides for a condition that any load applied to planetary hooks 300, 400, or 500 are transferred directly to plunger rod 600.

Figure 2:
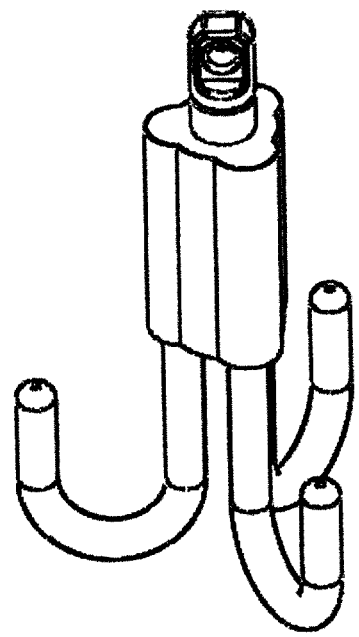
Figure 2:
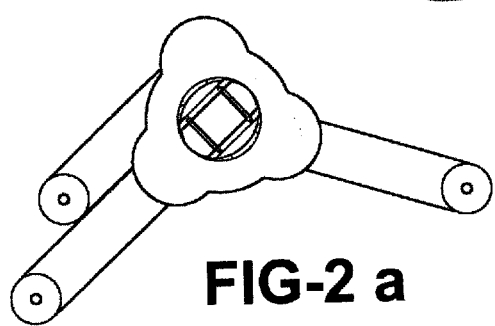
Figure 2:
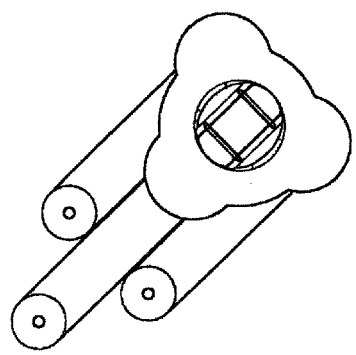
Figure 2:
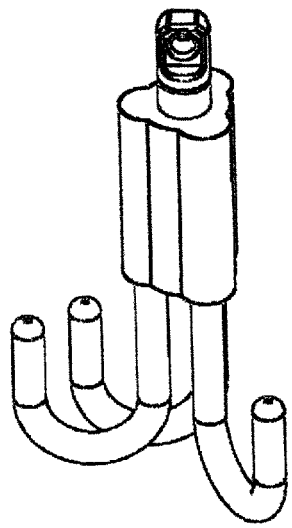
Figure 2:
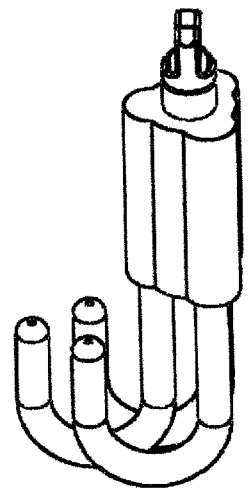

FIGS. 2, 2a and 2b illustrate hooks are illustrated positioned in various configurations of open and closed positions available at the operators discretion according to this invention.

FIG. 2 depicts a perspective view of the circumferentially foldable multiple pronged hook 100 of this invention with hook 300, 400, and 500 in the open and locked position.

FIG. 2a depicts a circumferentially foldable multiple pronged hook according to the invention with one hook (300 or 400) open and in the lock position and one hook (300 or 400) in the closed and locked.

FIG. 2b depicts a circumferentially foldable multiple pronged hook according to the invention with hooks 300 and 400 in the closed and locked position.

Figure 3:
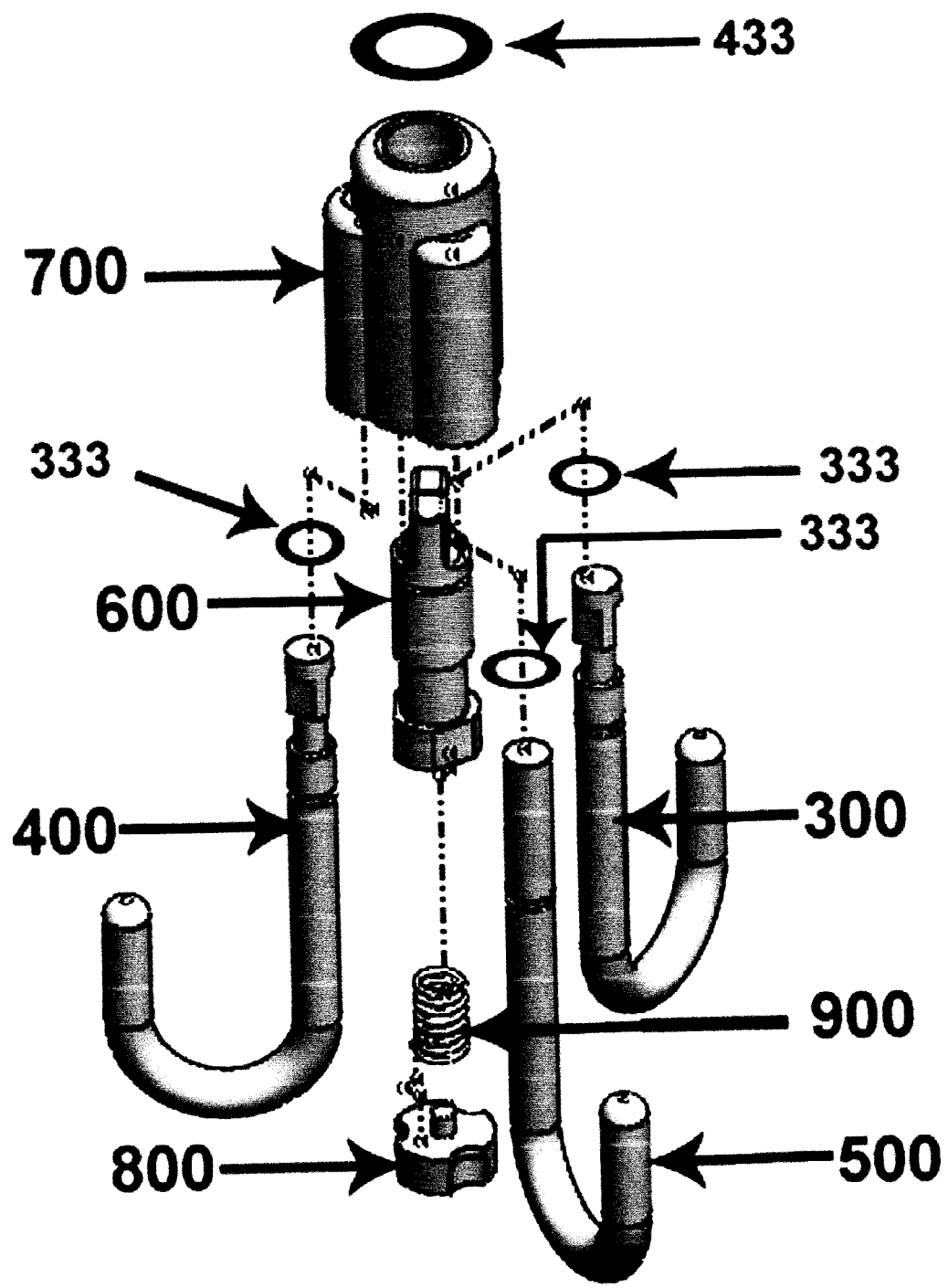
FIG. 3 depicts an exploded view of the first circumferentially foldable multiple pronged hook of this invention.

FIG. 3 depicts an exploded perspective view of the first circumferentially foldable multiple pronged hook of this invention. Each of the six components (hook 300, 400, 500, plug 800 and plunger 600) of the invention are shown to fit inside of the block 700 of the invention so as to prevent contamination from outside elements to the internal mechanical workings. Hooks 300, 400, and 500 fit inside block 700 along with plunger 600, plug 800 and spring 900. Also shown in FIG. 3 are the seals for hook and plunger sites.

Figure 4:
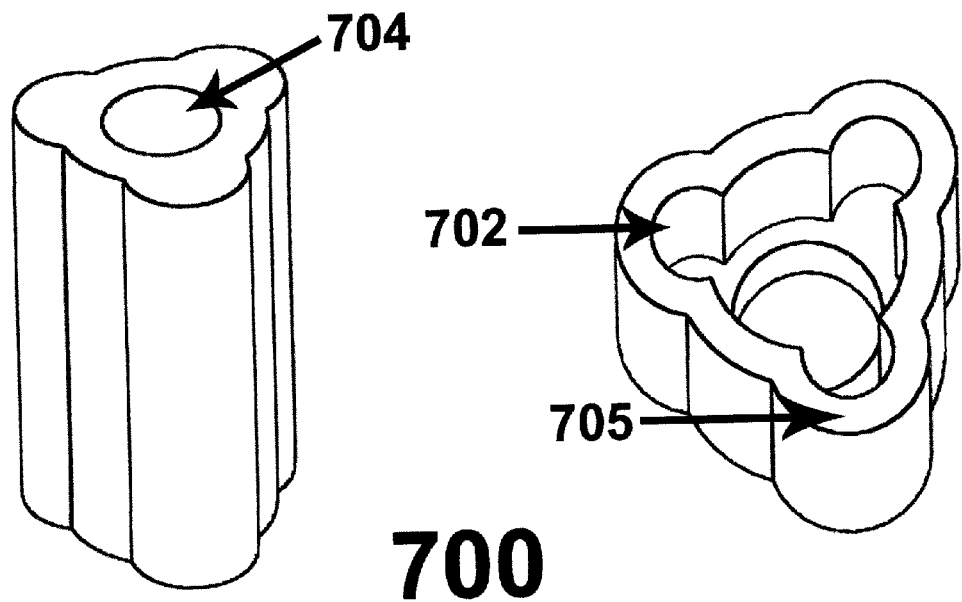
FIG. 4 depicts a first junction box of this invention in bottom isometric, front isometric, top and bottom views of this invention.
Figure 4:
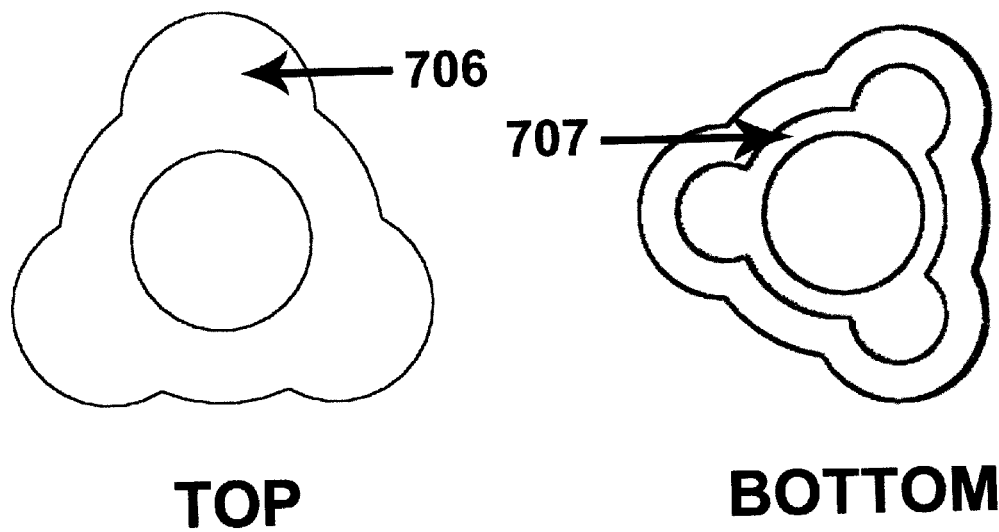

FIG. 4 depicts a first junction box 700 of this invention in bottom isometric, front isometric, top and bottom views of this invention. FIG. 4 shows junction block 700 of this invention highlighting aperture 704 to receive plunger rod 600. FIG. 4 also details interior hook shafts sites 702 and seat for plunger 600.

Figure 5:
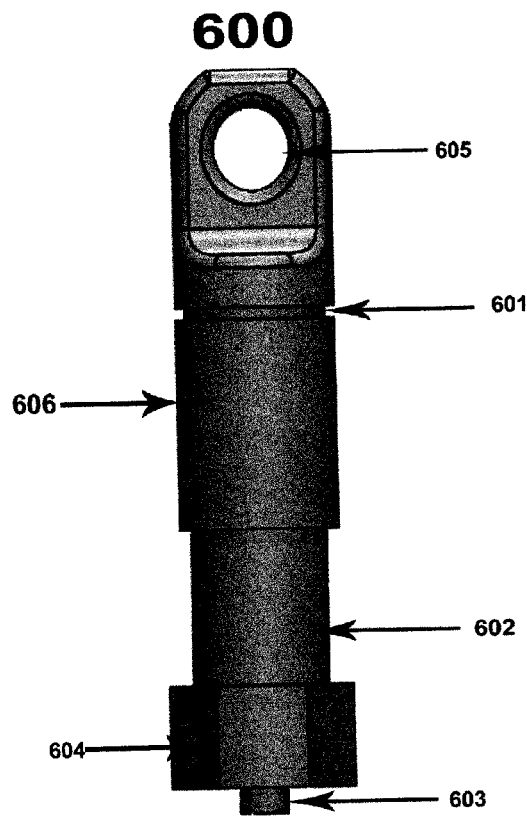
FIG. 5 depicts the front, side, bottom, and isometric views of plunger rod 600 assembly of this invention.
Figure 5:
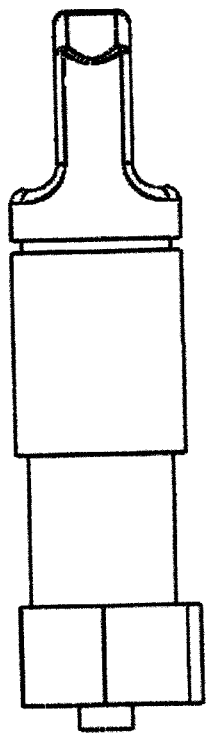
Figure 5:
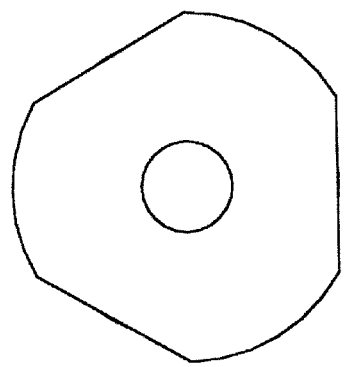
Figure 5:
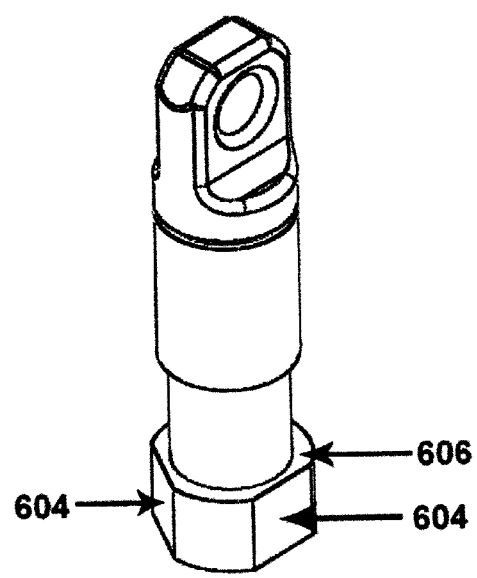

FIG. 5 depicts the front, side, bottom, and isometric views of plunger rod 600 assembly of this invention. FIG. 5 is showing plunger 600 of this invention with views of flats 604 that mate with flats on hooks 300, 400, and 500 of this invention. FIG. 5 also shows aperture 605 that will accept a rigging device. Also detailed in FIG. 5 is the reduced round 602 to allow the hook shafts clearance of motion while disengaged from flats in hooks 300, 400, and 500.

Figure 6:
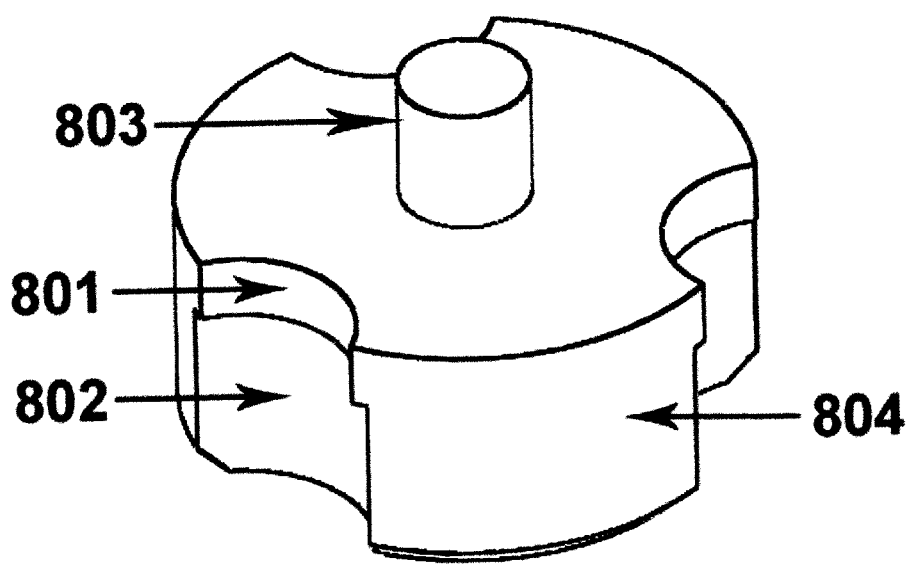
FIG. 6 depicts the plug of this invention in bottom, and isometric views of this invention.
Figure 6:
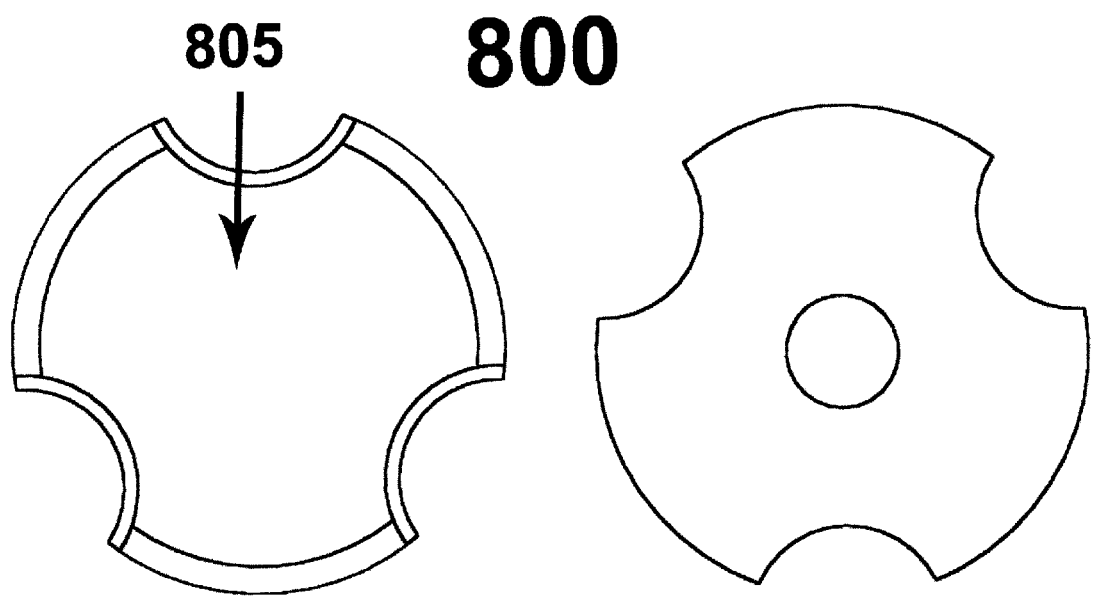

FIG. 6 depicts the plug 800 of this invention in bottom, and isometric views of this invention. FIG. 6 shows end plug 800 of this invention and details hook seats 802 with raised keys 801 that mate with relieved round sections 304,404, and 504 in shafts of the 300, 400, and 500 hook shafts. FIG. 6 also details spring keeper 803.

Figure 7:
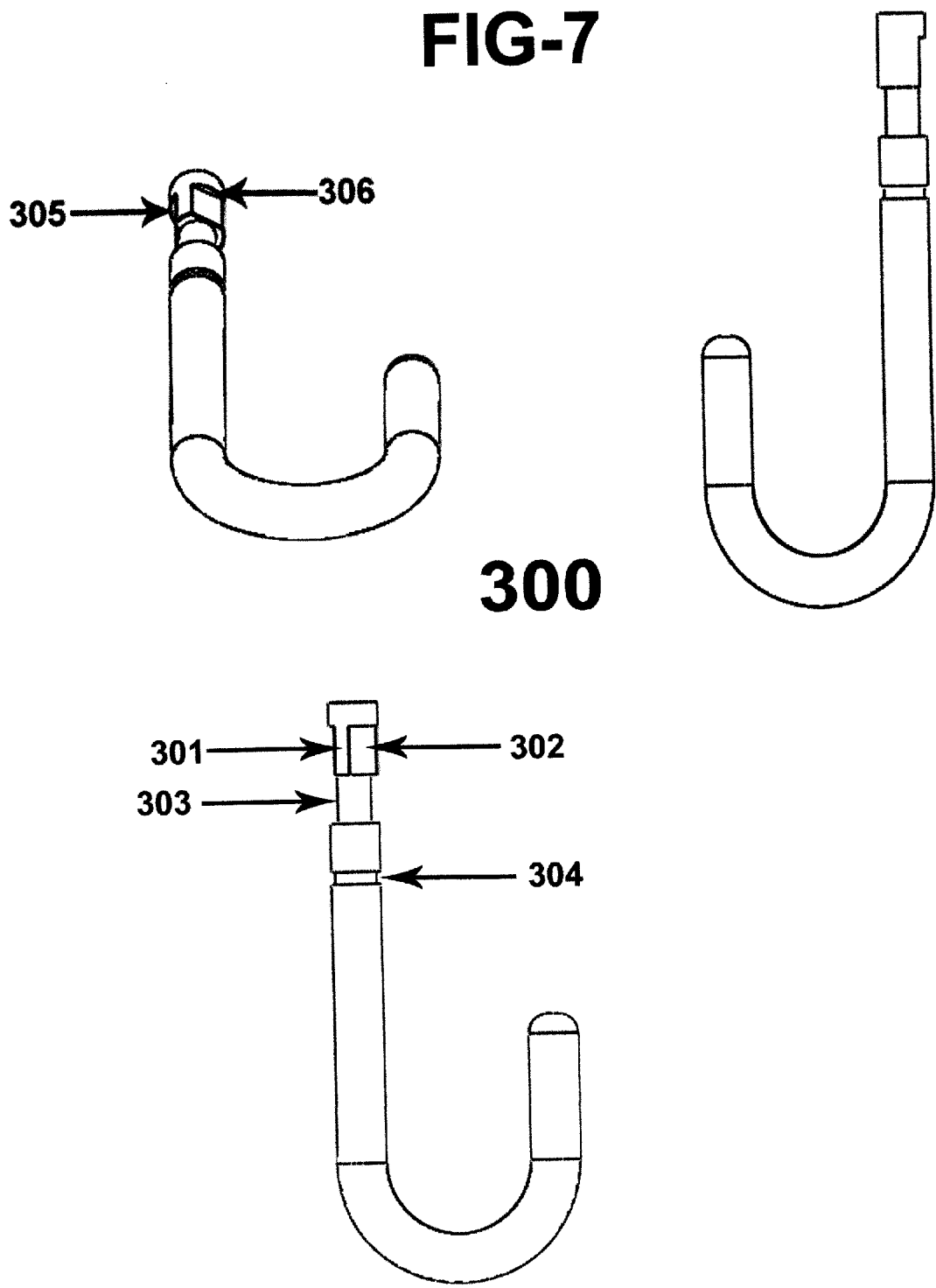
FIG. 7 depicts right, left, and isometric views of the planetary hook 300 of this invention.

FIG. 7 depicts right, left, and isometric views of the planetary hook 300 of this invention. FIG. 7 shows hook 300 of this invention detailing the supporting lip 306 that will support any stress from force that is applied to aperture 605. It also shows flats to mate with plunger 600 and reduced round 304 to accept key 801 of the end plug. Also detailed is the reduced round 303 that allows clearance for plunger 600 of this invention as the hook 300 is rotated on its own axis.

Figure 8:
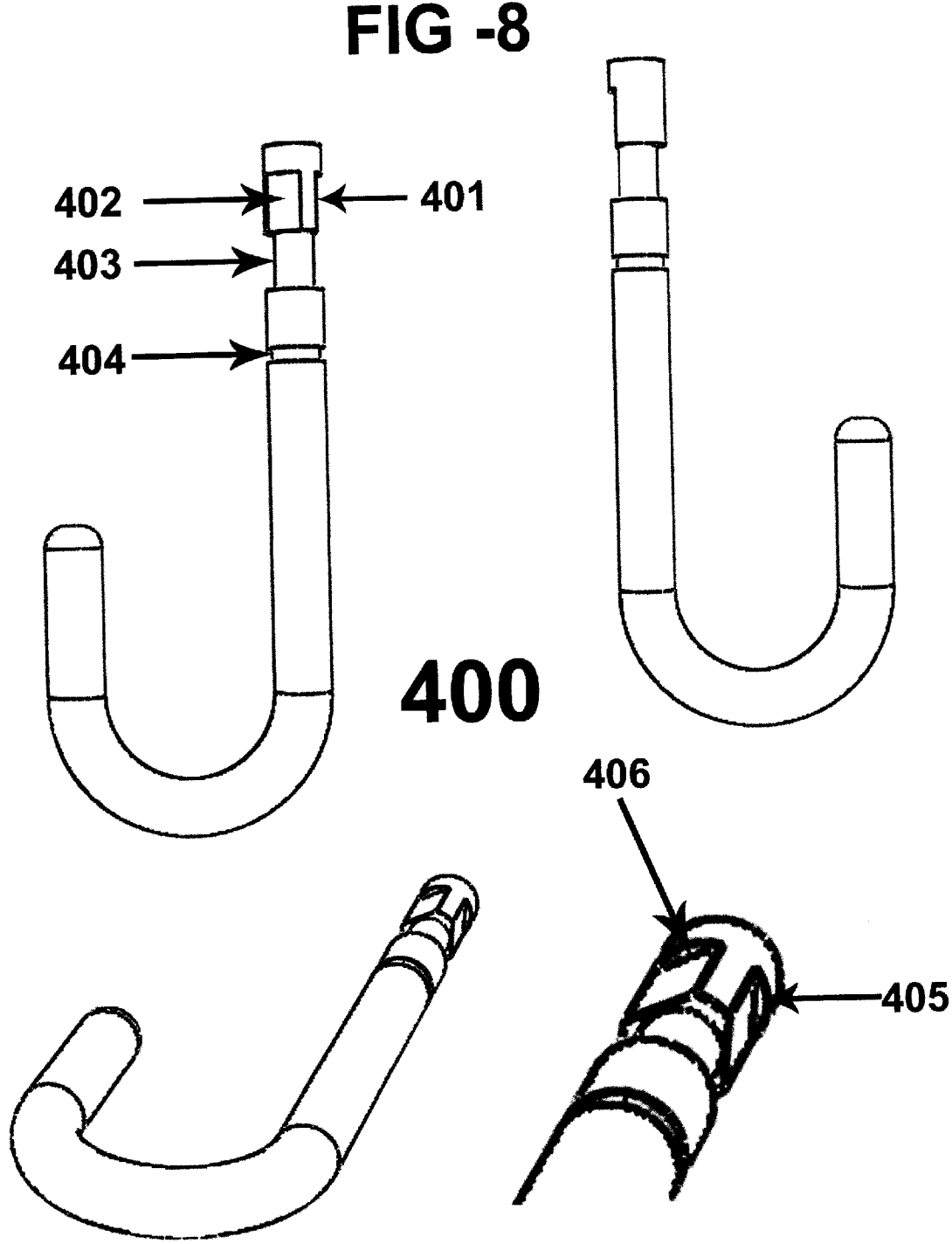
FIG. 8 depicts a right, left, and isometric views of the planetary hook 400 of this invention.

FIG. 8 depicts a right, left, and isometric views of the planetary hook 400 of this invention. FIG. 8 shows hook 400 of this invention detailing the supporting lip 406 that will support any stress from force that is applied to aperture 605. It also shows flats to mate with plunger 600 and reduced round 404 to accept key 801 of the end plug. Also detailed is the reduced round 403 that allows clearance for plunger 600 of this invention as the hook 400 is rotated on its own axis.

Figure 9:
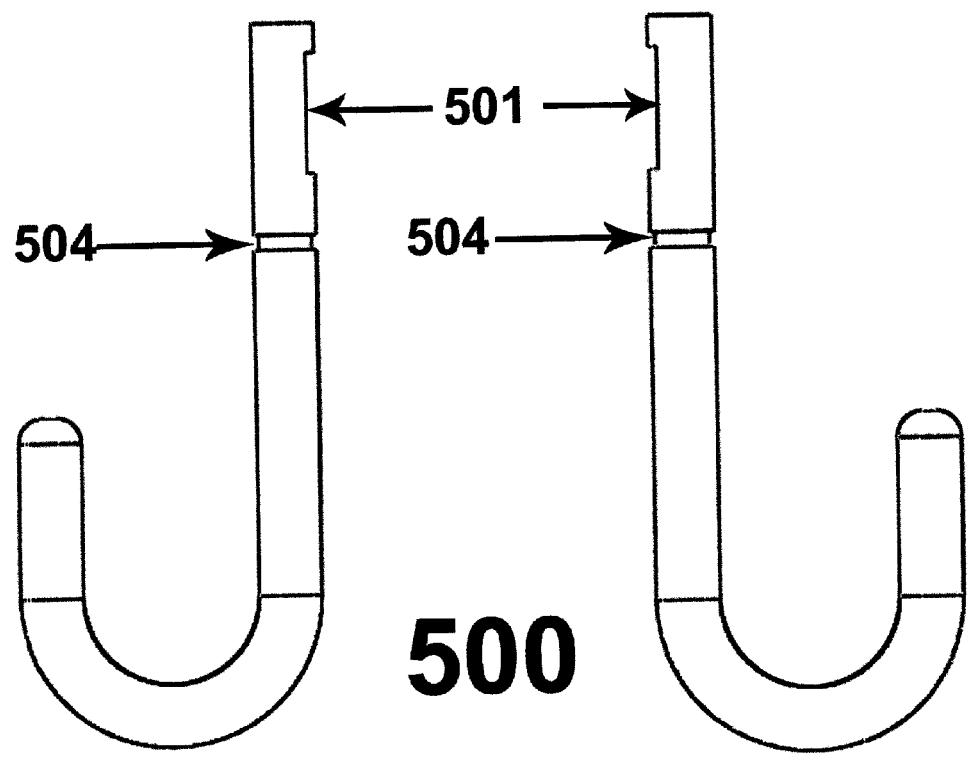
FIG. 9 depicts right, left, and isometric views of the planetary hook 500 of this invention.
Figure 9:
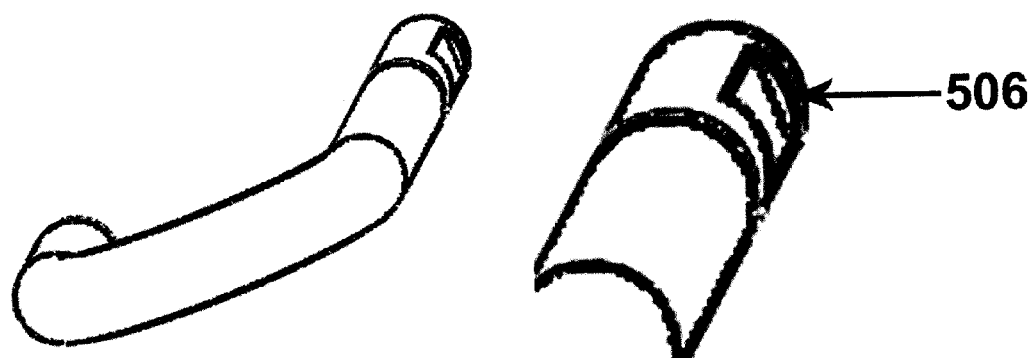

FIG. 9 depicts right, left, and isometric views of the planetary hook 500 of this invention. FIG. 9 shows hook 500 of this invention detailing the supporting lip 506 that will support any stress from force that is applied to aperture 605. It also shows flat to mate with plunger 600 and reduced round 504 to accept key 801 of the end plug. Hook 500 remains stationary in the hook seat 702 due to an extended lower flat surface without the reduced round cross section in its hook shaft as in the two non-stationary hooks. The two non-stationary hooks can move because of the reduced round cross sections 303 and 403 of FIGS. 7 and 8.

Figure 10:
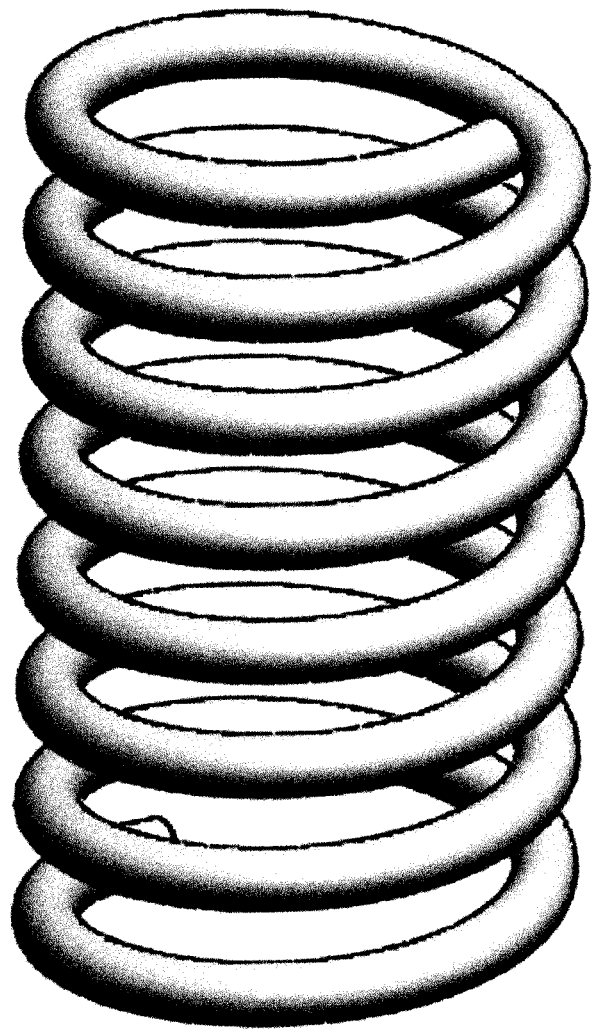
FIG. 10 depicts the front view of spring used in this invention.

FIG. 10 depicts the front view of spring 900 used in this invention. FIG. 10 shows the compression spring responsible for the axial action of the 600 plunger.

FIGS. 5 through 10 are detailed images of hook 300, hook 400, hook 500, plunger 600, plug 800, and spring 900. Detailing the parts that are designed to fit into block 600 and remain sealed from outside contamination. The lower shafts and appendages of each of the hooks will remain outside of the enclosed block 700 to enable the art and intended use of the circumferentially foldable multiple pronged hook.

What is claimed for this invention:

1. A multiple pronged hook, comprising
   a plurality of planetary hooks, each hook having a shaft opposite a hooked end, at least one of the planetary hooks is a circumferentially rotatable hook with a cylindrical shaft opposite the hooked end;
   a junction body coupled to securely enclose each of the shafts of the plurality of planetary hooks and further comprising a cylindrical opening to rotatably accommodate the cylindrical shaft of the at least one circumferentially rotatable hook; and
   a plunger rod comprising a rigging aperture at a top end thereof, a bottom end of the plunger slidably disposed within a center of the junction body between the shafts of the plurality of planetary hooks, the plunger rod configured to rotatably lock the at least one circumferentially rotatable hook when the plunger rod is in an up position and rotatably unlock the at least one circumferentially rotatable hook when the plunger rod is in a down position.

2. A multiple pronged hook according to claim 1, further comprising a spring biasing the plunger rod towards a top relative to the junction body and, when the plunger rod is depressed down relative to the top of the junction box, the at least one circumferentially rotatable hook is unlocked and released for rotation.

3. A multiple pronged hook according to claim 1, wherein the cylindrical shaft of the circumferentially rotatable hook comprises a first flat surface at a predetermined distance from the top of said shaft at a second predetermined angle on said shaft in relation to the hooked end to allow the plunger rod to secure the circumferentially rotatable hook at a third predetermined angle.

4. A multiple pronged hook according to claim 3, wherein the cylindrical shaft of the circumferentially rotatable hook further comprises a second flat surface at the predetermined distance from the top of said shaft at a second predetermined angle on said shaft in relation to the hooked end to allow the plunger rod to secure the circumferentially rotatable hook at a forth predetermined angle.

5. A multiple pronged hook according to claim 1, wherein at least one of the planetary hooks remains locked in a stationary position and at least one of the circumferentially rotatable hooks is configured to rotates the hooked end circumferentially on its corresponding shaft into a parallel position relative to the hooked end of the planetary hooks that remains locked in a stationary position.

6. A multiple pronged hook according to claim 5, wherein the cylindrical shaft of the circumferentially rotatable hook further comprises a full round cross section extending from a predetermined distance from a top of the shaft to a predetermined distance below the top of the shaft created by machining the first flat surface and the second flat surface s into the round cross sections of said hooks shaft's at said predetermined distance from the top of said hook shaft thereby creating a lip over each said flat from the remaining full round cross section on the shaft.

7. A multiple pronged hook according to claim 4, wherein the cylindrical shaft of the circumferentially rotatable hook further comprises a reduced round cross section from a predetermined distance from a top of the shaft to a predetermined distance below the top of the shaft essentially adjacent to the plurality of the first flat surface and the second flat surface.

8. A multiple pronged hook according to claim 5, wherein the plunger rod comprises a plurality of flat surfaces machined into the plunger rod at predetermined angles around an axis of the plunger rod that mate with a the first flat surface and the second flat surface of the shaft of the at least one planetary hook.

9. A multiple pronged hook according to claim 8, wherein the plunger rod comprises a reduced round surface at a predetermined distance relative to the first flat surface and the second flat surface machined into said plunger rod creating a mating lip that will abut the lip of the at least one planetary hook.

10. A multiple pronged hook according to claim 1, wherein the junction body comprises an enclosed, sealed, junction is configured to seal and protect the shafts therein from outside elements and debris.

11. A multiple pronged hook according to claim 10, wherein the junction body further comprises individual, enclosed, hook sites located in predetermined positions around the central axis of said junction body.

12. A multiple pronged hook according to claim 10, wherein the junction body further comprises seats for O-rings, seals or other protective devices on at least one shaft protruding from said junction body.

13. A multiple pronged hook according to claim 9, further comprising an end plug comprising hook shaft sites at predetermined locations around a central axis of the end plug that allows for rotation of the shafts of the at least one circumferentially rotatable hook, while keeping shafts in place circumferentially.

14. A multiple pronged hook according to claim 13, wherein the end plug comprises raised keys around a perimeter thereof.

15. A multiple pronged hook according to claim 14, wherein the shaft of the at least one circumferentially rotatable hook comprises a reduced round cross section at a predetermined distance from the top of said hook to mate with one of the raised keys of the end plug.

* * * * *